United States Patent [19]

Kochiyama et al.

[11] Patent Number: 5,194,869

[45] Date of Patent: Mar. 16, 1993

[54] RANGING METHOD USING TELEMETERING AND APPARATUS EMPLOYING SAID METHOD

[75] Inventors: Jiro Kochiyama, Saitama; Makoto Miwada; Toshiaki Sato, both of Tokyo; Takuji Morita, Saitama; Teruo Fujiwara, Tokyo; Shoji Kaneda, Tokyo; Kazutaka Maruta, Tokyo; Hajime Ogawa, Tokyo, all of Japan

[73] Assignees: National Space Development Agency of Japan, Tokyo; Nissan Motor Co., Ltd., Yokohama; Meisei Electric Co., Ltd., Tokyo, all of Japan

[21] Appl. No.: 916,943

[22] Filed: Jul. 20, 1992

[30] Foreign Application Priority Data

Jul. 30, 1991 [JP] Japan .................. 3-190300

[51] Int. Cl.⁵ .......................... G01S 13/10
[52] U.S. Cl. ...................... 342/125; 342/50; 342/127
[58] Field of Search ............ 342/125, 50, 127

[56] References Cited

U.S. PATENT DOCUMENTS

| | | | |
|---|---|---|---|
| 3,611,373 | 10/1971 | Cartwright | 342/134 |
| 3,659,085 | 4/1972 | Potter et al. | 342/451 |
| 3,801,979 | 4/1974 | Chisholm | 342/31 |
| 4,375,697 | 3/1983 | Visher | 342/356 X |
| 4,398,195 | 8/1983 | Dano | 342/46 |
| 4,590,445 | 5/1986 | Tabourier et al. | 342/200 |
| 4,814,994 | 3/1989 | Doane et al. | 342/29 X |
| 4,843,397 | 6/1989 | Galati et al. | 342/59 |
| 5,019,824 | 5/1991 | Kumar | 342/195 |
| 5,107,261 | 4/1992 | Friedman et al. | 342/118 X |

*Primary Examiner*—John B. Sotomayor
*Attorney, Agent, or Firm*—McAulay Fisher Nissen Golberg & Kiel

[57] ABSTRACT

A ranging method for measuring the flight distance of a flight object is implemented by means of a simple system construction. The ranging method is also capable of continuing ranging even if an interruption occurs in data transmission. The ranging method comprises the steps of inserting ranging pulses in a telemeter signal transmitted from a transmitting apparatus provided on the flight object, separating and extracting a ranging pulse from a telemeter signal received by a receiving apparatus provided on the ground side, obtaining a time difference between the ranging pulse and a reference clock signal generated in the receiving apparatus on the basis of a time reference equal to that of the transmitting apparatus (clock signal periods t1 and t2 of both time references are equal), and calculating the flight distance. Since there is no need to provide a transponder or the like on the flight object nor to provide a ranging-tracking system on the ground side, it is possible to realize a simple system construction. Since the ranging pulses are transmitted in the state of being contained in the telemeter signal, it is not necessary to independently prepare ranging-signal transmiting means. In addition, since the telemeter signal can be restored at any time on the ground side, it is possible to prevent ranging from being made impossible due to the interruption of transmission of the signal.

5 Claims, 2 Drawing Sheets

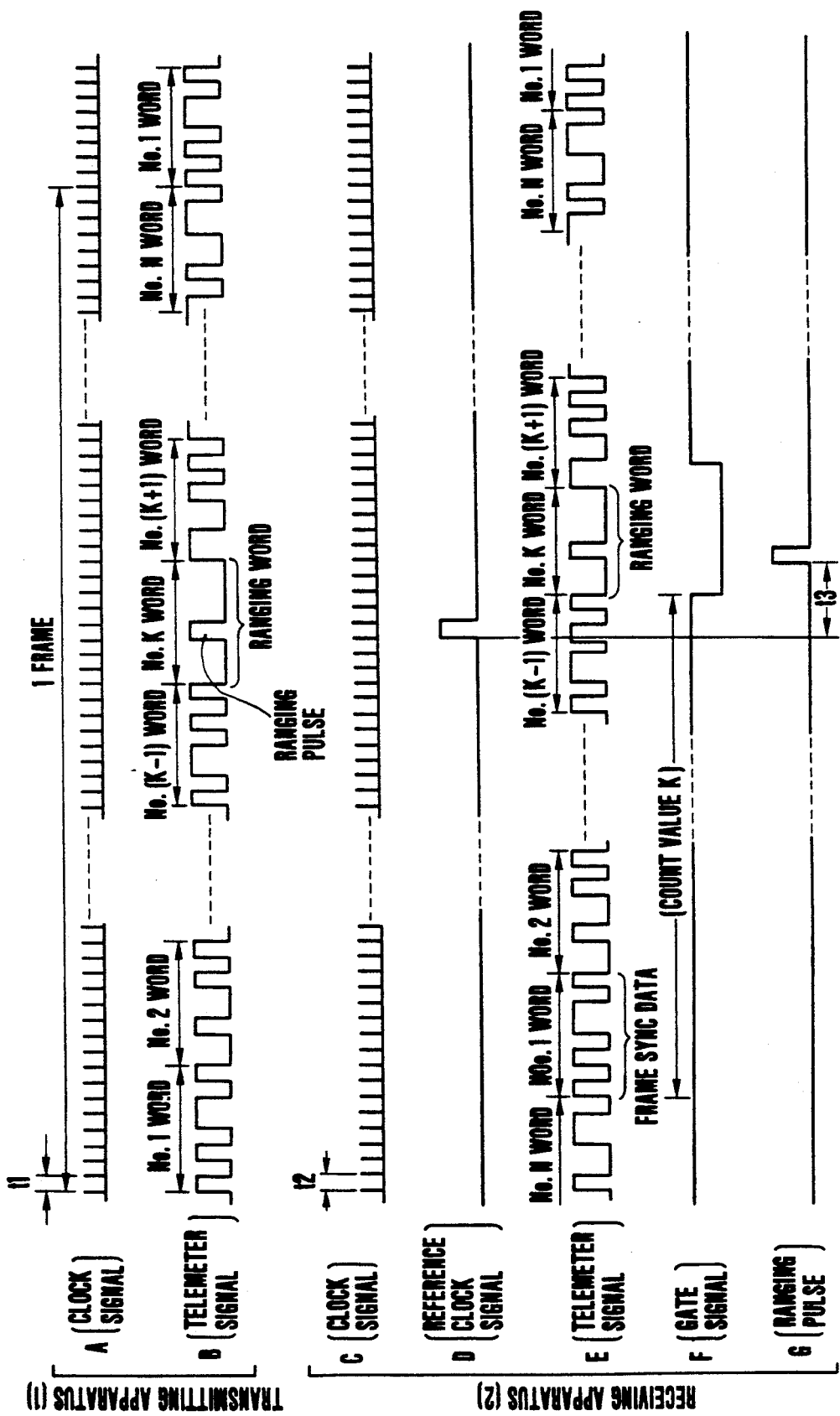

RANGING METHOD USING TELEMETERING AND APPARATUS EMPLOYING SAID METHOD

BACKGROUND OF THE INVENTION a) Field of the Invention

The present invention relates to a ranging method for measuring the flight distance of a flight object such as a rocket and, more particularly, to a ranging method including the steps of inserting ranging signals into a telemeter signal to be transmitted from a telemeter transmitting apparatus mounted on a flight object, transmitting the telemeter signal which contains the ranging signals, and measuring the flight distance of the flight object. The invention also relates to apparatus for accomplishing the method.

b) Description of the Related Art

Several methods have been utilized for measuring the distance to the flight point (i.e., the flight distance) of a flight object such as a rocket. A first method includes the steps of transmitting a ranging signal toward a flight object from an apparatus provided on the ground, measuring the time taken for the ranging signal to travel to the flight object and return to the apparatus provided on the ground, and computing the flight distance from the measured time. A second method (Doppler integration method) includes the steps of receiving at an apparatus on the ground a ranging signal (alternating-current signal) transmitted from a flight object, measuring and integrating the Doppler shift of the received signal, and computing the flight distance from the resultant integral. A third method (asynchronous tone method) includes the steps of measuring the propagation delay phase of the aforesaid received signal and computing the flight distance from the amount of such phase delay. The first method is called a two-way method, and the second and third methods are called one-way methods.

The advantage of the two-way ranging method is that it is possible to measure the flight distance at an arbitrary point in time. However, the two-way ranging method has a number of disadvantages. For example, it is necessary to prepare a flight-object tracking system for ranging purposes separately from a telemeter system, it is necessary to mount on a flight object a transponder, a reflector or a similar device for returning a ranging signal, and it is also necessary to provide both a receiver and a transmitter on a ground side for ranging purposes. These necessities lead to a number of disadvantages such as the need for an extremely complex and expensive system construction.

The one-way ranging method has the advantage of implementing an inexpensive system construction since it is possible to adopt a ranging system including a ground-side part which can be constructed of receiving elements only and hence does not need a large-scale tracking system, and, furthermore, it is not necessary to mount a ranging-signal returning device such as a transponder or a reflector on a flight object (transmitting elements need only to be mounted thereon). However, the one-way ranging method has the following disadvantages. For example, it is necessary to transmit separately a ranging signal and a telemeter signal. In addition, since the ranging signal from a flight object must be received and observed continuously from the time of the start of flight of the flight object, if the reception of the ranging signal from the flight object is interrupted due to any cause, ranging subsequent to the time of occurrence of the interruption becomes impossible.

In other words, in the case of the Doppler integration method, no integral is obtained during the period in which it is impossible to receive the ranging signal. As a result, it becomes impossible to detect any flight distance during such a period and overall ranging computations will be impossible.

In the asynchronous tone method, if the flight distance becomes equal to or greater than the wavelength of a ranging signal (so-called over wavelength), the flight distance is obtained from delay phase within one wavelength and the number of over wavelengths. Accordingly, if any over wavelength occurs during the period in which it is impossible to receive the ranging signal, it is impossible to detect the fact that the over wavelength has occurred and, if so, the number of over wavelengths, so that ranging computations will be impossible.

To increase a distance which can be measured within one wavelength, a signal of long wavelength may be employed. Since this method is disadvantageous in terms of ranging accuracy, the asynchronous tone method uses two or more kinds of signals, such as a signal of long wavelength and a signal of short wavelength, to compute the flight distance on the basis of the amount of phase delay of each of the signals. However, this method needs two or more kinds of signals for ranging purposes and, in addition, if the flight distance exceeds the wavelength of the long-wavelength signal, a problem similar to the aforesaid one takes place. For this reason, the above-described method is not a perfect solution.

SUMMARY OF THE INVENTION

It is, therefore, an object of the present invention to solve the above-described problems of the related art.

Another object of the present invention is to provide a ranging method which makes it possible to perform ranging utilizing a telemeter system, thereby enabling a ranging operation to be restarted after reception recovery even if the reception of a signal from a flight object is interrupted.

A further object of the present invention is to provide a ranging method which makes it possible to perform ranging utilizing signal transmission in one direction (transmission of a ranging signal from a flight object toward the ground), thereby realizing a simple and inexpensive system construction.

To achieve the above objects, in accordance with the present invention, there is provided a ranging method which basically belongs to a one-way method and which comprises the steps of: preparing a telemeter transmitting apparatus and a telemeter receiving apparatus, the telemeter transmitting apparatus being provided on a flight object and the telemeter receiving apparatus being provided on the ground, the telemeter transmitting apparatus and the telemeter receiving apparatus being operative on the basis of time references of their own; causing the telemeter transmitting apparatus to transmit a telemeter signal which is formed on the basis of the time reference of its own, which is composed of a serial data sequence having a frame construction made up of a plurality of words, and which has ranging words inserted at intervals of a predetermined number of words, each of the ranging words containing a ranging signal only; causing the telemeter receiving apparatus to generate ranging reference clock signals on the basis of the time reference of its own at intervals equivalent to the periods of insertion of the respective ranging words in the telemeter signal; causing the time reference of the telemeter transmitting apparatus and the time reference of the telemeter receiving apparatus to agree with each other prior to flight of the flight object; and causing the telemeter receiving apparatus to separate and extract a ranging word from the telemeter signal received from the telemeter transmitting apparatus, input the thus-obtained ranging word and the ranging reference clock signal generated by the telemeter receiving apparatus into a ranging computing part on the basis of an identical time reference, and calculating the flight distance of the flight object on the basis of a time difference between the obtained ranging signal and the ranging reference clock signal by means of the ranging computing part.

The ranging signals are contained at intervals of a predetermined period in the telemeter signal which is transmitted from the telemeter transmitting apparatus on the flight object and received by the telemeter receiving apparatus on the ground, while the ranging reference clock signals are generated at intervals of the same period as the predetermined period in the telemeter receiving apparatus. The time references of both the telemeter transmitting apparatus and the telemeter receiving apparatus are adjusted so that they are the same as each other, prior to the flight of the flight object. Accordingly, since the period of transmission of the ranging signal and the period of generation of the ranging reference clock signal agree with each other, it is possible to achieve ranging by measuring the delay time of the ranging signal transmitted from the flight object (telemeter transmitting apparatus), with respect to the ranging reference clock signal generated independently by the telemeter receiving apparatus.

Since the ranging signal is inserted into each predetermined word in the telemeter signal, a single kind of signal (telemeter signal) may be transmitted from the flight object. In addition, since the telemeter signal is a signal which can be restored within the telemeter receiving apparatus even if it is discontinuously received (i.e., a frame-synchronized signal), it is possible to again perform a ranging operation after reception recovery even if the reception of the signal is interrupted.

Furthermore, since the ranging signal is transmitted in one direction from the flight object toward the ground (one-way ranging), the ranging system required to realize a ranging operation can be constructed of the transmitting apparatus on the flight object and the receiving apparatus on the ground.

The above and other objects, features and advantages of the present invention will become apparent from the following detailed description of a preferred embodiment of the present invention, taken in conjunction with the accompanying drawings.

BRIEF DESCRIPTION OF THE DRAWINGS

FIG. 2 is a timing chart which assists in explaining the operation of the preferred embodiment of the present invention.

DETAILED DESCRIPTION OF THE PREFERRED EMBODIMENT

A preferred embodiment of the present invention will be described below with reference to the accompanying drawings. In the following description of the preferred embodiment, a rocket is referred to as one example of a flight object.

Figure 1A:
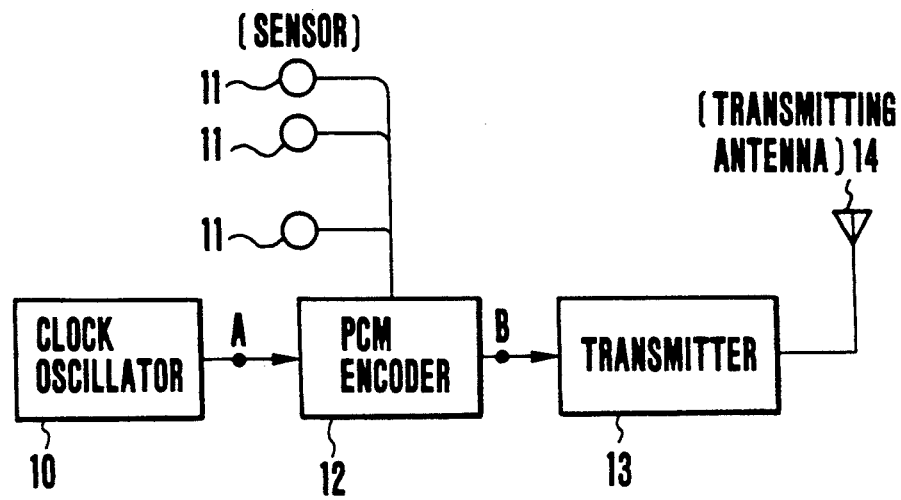
FIG. 1(A) is a schematic block diagram showing a telemeter transmitting apparatus according to a preferred embodiment of the present invention.
Figure 1B:
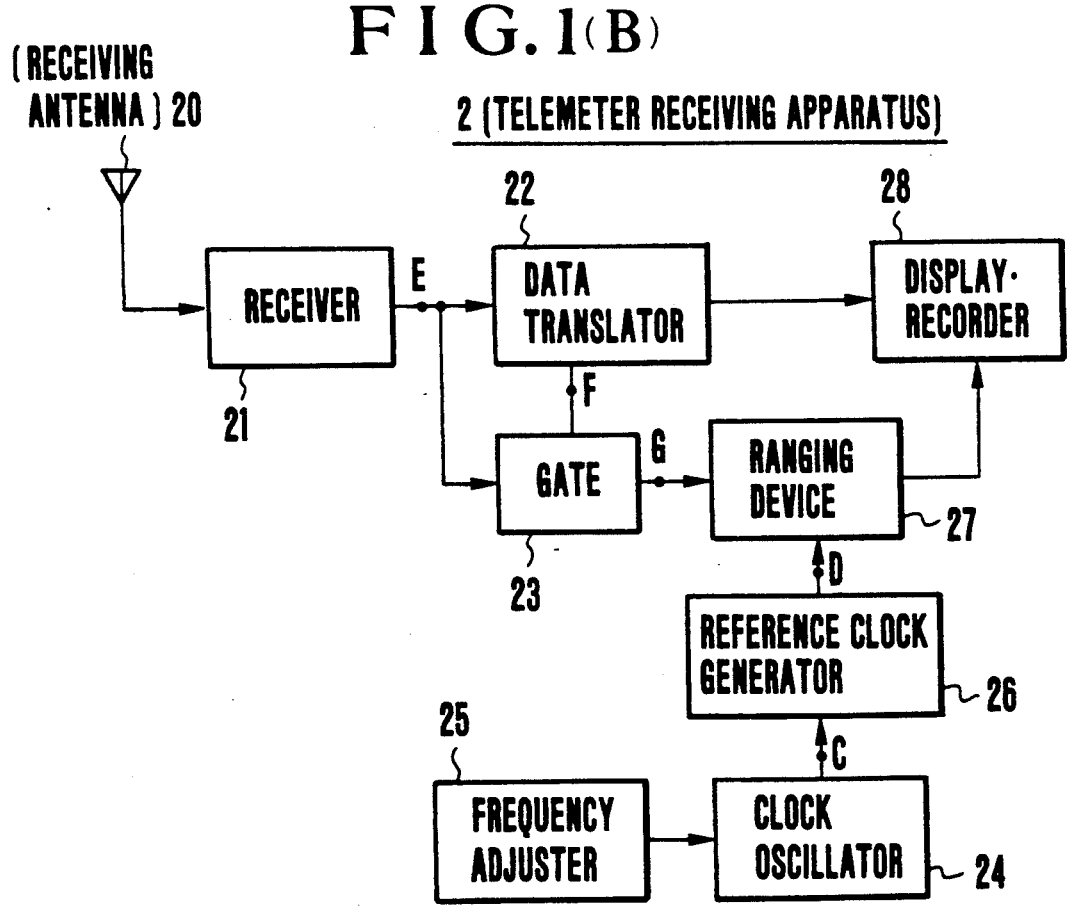
FIG. 1(B) is a schematic block diagram showing a telemeter receiving apparatus according to the preferred embodiment of the present invention.

FIG. 1(A) is a schematic block diagram showing the construction of a telemeter transmitting apparatus mounted on the rocket, FIG. 1(B) is a schematic block diagram showing the construction of a telemeter receiving apparatus provided on the ground, and FIG. 2 is a timing chart which aids in explaining the operation of each of the telemeter transmitting and receiving apparatus, showing the states of signals provided at the respective points shown as A to G in FIGS. 1(A) and 1(B).

As shown in FIG. 1(A), a telemeter transmitting apparatus (hereinafter referred to as a "transmitting apparatus") 1 is made up of a clock oscillator 10 consisting of a high-stability crystal oscillator for generating a clock signal which serves as a time reference for the operation of the transmitting apparatus 1, various sensors 11 for outputting measurement data, the sensors being provided for each individual object to be measured, a PCM encoder (hereinafter referred to as an encoder) 12 for coding the measurement data outputted from the sensors 11 into PCM data on the basis of the clock signal generating by the clock oscillator 10, a transmitter 13 for modulating a carrier with a PCM data sequence (telemeter signal) outputted from the encoder 12 and generating a signal to be transmitted, and a transmitting antenna 14 for radiating the signal outputted from the transmitter 13 as a radio wave.

As shown in FIG. 1(B), a telemeter receiving apparatus (hereinafter referred to as a receiving apparatus) 2 is made up of a receiving antenna 20 for receiving a radio wave from the transmitting apparatus 1, a receiver 21 for decoding the radio wave received at the receiving antenna 20 and outputting a PCM data sequence (telemeter signal), a data translator 22 for translating the telemeter signal outputted from the receiver 21 into measurement data or the like, a gate 23 for separating and extracting a ranging signal (ranging pulse) contained in the telemeter signal outputted from the receiver 21, from a PCM data sequence carried by another telemeter signal, a clock oscillator 24 for generating a clock signal which serves as a time reference for the operation of the receiving apparatus 2, the clock oscillator 24 consisting of a high-stability crystal oscillator, a frequency adjuster 25 for adjusting the oscillation frequency of the clock oscillator 24, a reference clock generator 26 for generating a reference clock signal for ranging purposes on the basis of the clock signal generated by the clock oscillator 24, a ranging device 27 for computing a distance (the flight distance of the rocket) on the basis of a ranging pulse outputted through the gate 23 and the reference clock signal outputted from the reference clock generator 26, and a display.recorder 28 for displaying and recording the measurement data outputted from the data translator 22 and the distance data outputted from the ranging device 27.

Particularly characteristic parts from among the above-described parts required for carrying out the present invention will be described below in further detail. The encoder 12 in the transmitting apparatus generates, as described above, a PCM data sequence in which words continue in series, the words each containing a serial data sequence obtained by coding the measurement data from the sensors 11 into PCM data. The encoder 12 is also arranged to automatically insert ranging words each containing only a ranging signal into the PCM data sequence, at intervals of a predetermined number of words, thereby forming a telemeter signal. The data translator 22 in the receiving apparatus 2 is arranged to output a control signal (gate signal) for opening the gate 23 when the aforesaid ranging word is translated.

In the transmitting apparatus 1, the clock oscillator 10 outputs a clock signal of period to at the point A as shown in Part A of FIG. 2. In practice, this clock signal is obtained by frequency-dividing an oscillating signal generated from a source oscillatory circuit (not shown) in the clock oscillator 10. The period t1 of the clock signal serves as a time reference for the operation of the transmitting apparatus 1.

The measurement data from each of the sensors 11 is inputted to the encoder 12, and the encoder 12 codes the measurement data into a PCM code on the basis of the clock signal from the clock oscillator 10, thereby forming a PCM data sequence. The encoder 12 also inserts ranging words each containing only a ranging pulse which serves as a ranging signal into the PCM data sequence, at intervals of a predetermined number of words, and also inserts frame sync data into a word appearing at an initial portion of each frame, thereby forming a telemeter signal. The encoder 12 outputs the thus-formed telemeter signal at the point B. As shown in Part B of FIG. 2, the telemeter signal is composed of a serial arrangement of N words (for example, 256 words) each having a word length of M bits (for example, 8 bits). The No. 1 word serves as a frame-synchronizing word which forms the frame sync data, and the No. K word serves as a ranging word containing a ranging pulse only.

The number of ranging words is not limited to one for each frame, and in general a plurality of ranging words may be inserted into each frame. In the case of inserting a plurality of ranging words into each frame, it is preferable that the ranging words be inserted at intervals of a predetermined number of words over the entire telemeter signal irrespective of the period of each frame. For example, in the embodiment, among the 256 words which constitute one frame, the No. 32 word (which means the thirty-second word, the No. 96 word the ninety-sixth word, and so forth), the No. 96 word, the No. 160 word and the No. 224 word are inserted as ranging words, respectively. In the entire telemeter signal, each ranging word is inserted every sixty-fourth word.

The period of such a ranging word, that is, the repetition period of the ranging pulse, is preferably set to a period which is equal to or greater than the delay time of a signal equivalent to the maximum value of a distance to be measured. In the above-described embodiment, the period is set to 6.25 msec (the transmission time of one frame of the telemeter signal is 25 msec), and this period time is equivalent to a distance of approximately 1,875 km, which suffices to measure the flight distance of the rocket.

The telemeter signal which has been outputted at the point B in the above-described manner is inputted to the transmitter 13. The transmitter 13 modulates a carrier with the telemeter signal by means of an appropriate modulation method, thereby generating a signal to be transmitted. The signal is radiated from the transmitting antenna 14 as a radio wave.

In the receiving apparatus 2, the clock oscillator 24 outputs a clock signal of period t2 at the point C as shown in Part C of FIG. 2. The period t2 serves as a time reference for the receiving apparatus 2. The clock signal is in practice obtained by frequency-dividing the oscillating signal of a source oscillatory circuit in a manner similar to that in which the clock signal is obtained in the aforesaid transmitting apparatus 1.

Prior to launching of the rocket, the period t2 of the clock signal outputted from the clock oscillator 24 is adjusted by the frequency adjuster 25 so that the period t2 agrees with the period t1 of the clock signal of the transmitting apparatus mounted on the rocket. As described above, the clock signal is obtained by frequency-dividing the oscillating signal of the source oscillator. Therefore, by adjusting the frequency of the source oscillator by means of the frequency adjuster 25, the clock periods t1 and t2 of the apparatus 1 and 2 can be made to accurately agree with each other. By making the clock periods t1 and t2 agree with each other, the time reference of the transmitting apparatus 1 and that of the receiving apparatus 2 are made to agree with each other.

The clock signal outputted at point C is inputted into the reference clock generator 26. The reference clock generator 26 counts the clock signals, and outputs the reference clock signals at the point D, as shown in Part D of FIG. 2, at intervals equivalent to the periods of insertion of the respective ranging words in the telemeter signal outputted from the encoder 12 of the receiving apparatus 1.

As described previously, the period t2 of the clock signal of the receiving apparatus 2 is in agreement with the period t1 of the clock signal of the transmitting apparatus 1. Therefore, the repetition period time of the reference clock signal outputted at the point D agrees with the repetition period time of the ranging pulse in the telemeter signal outputted at the point B of the transmitting apparatus 1. For ease of understanding, in FIG. 2, the ranging pulse outputted at the point B and the reference clock signal outputted at the point D are shown in phase with each other. However, both signals need not necessarily be in phase. This is because it is possible to know the phase difference between both signals before launching of the rocket and, by inputting the known phase difference to the ranging device 27 which will be described later, it is possible to correct a distance equivalent to the phase difference during distance computations.

The reference clock signal is inputted to the ranging device 27 in the above-described manner. During this time, if a radio wave containing the telemeter signal is radiated from the transmitted apparatus 1 of the rocket in flight through the above-described operation, the radio wave is received by the receiving antenna 20 of the receiving apparatus 2 on the ground and supplied to the receiver 21. The receiver 21 demodulates the received signal and outputs at the point E the telemeter signal shown in Part E of FIG. 2. (For convenience of explanation, the telemeter signal outputted at the point E is hereinafter called a received telemeter signal, and the telemeter signal outputted at the point B a transmitted telemeter signal.)

As a matter of course, the received telemeter signal outputted at the point E is a signal which contains the same data as the transmitted telemeter signal outputted at the point B in the transmitting apparatus 1. In addition, the received telemeter signal is delayed by a time corresponding to the flight distance of the rocket which elapses after the moment of transmission of the transmitted telemeter signal (i.e., by the time taken to propagate the radio wave over the flight distance).

The received telemeter signal is inputted to both the data translator 22 and the gate 23.

The data translator 22 identifies the frame sync data (No. 1 data) contained in the PCM data sequence of the inputted received telemeter signal and translates the received telemeter signal into measurement data on the basis of the frame sync data, delivering the measurement data to the display recorder 28. At the same time, the data translator 22 starts counting the number of words from the No. 1 word which contains the frame sync data. When a count value K is reached, the data translator 22 outputs at the point F the gate signal shown in Part F of FIG. 2. The width of the gate signal is equivalent to the time length of one word.

If a plurality of ranging words are inserted into one frame, the content of the count value K corresponding to the first ranging word differs from that of the count value K corresponding to each of the second and subsequent ranging words. The difference between the contents of the respective count values K will be described below with reference to the specific example explained above in connection with the transmitted telemeter signal. If the number of words are counted from the frame sync data, the count value K corresponding to the first ranging word assumes 32. The count value K corresponding to each of the second to fourth words assumes 64 if the number of words are counted from the next word to the preceding ranging word. This pattern of counting is achieved, for example, by arranging a counter in the data translator 22 in such a manner as to clear the counter in response to the input of the frame sync data, start counting immediately, and produce an output when each count value of 32, 96, 160 and 224 is reached.

When the gate signal is outputted at the point F in the above-described manner, the gate 23 opens and the received telemeter signal which is at that time outputted at the point E from the receiver 21 is passed through the gate 23 to the point G. Since the received telemeter signal outputted at the point E at that time is a ranging word, the signal outputted at the point G is the ranging pulse contained in the ranging word, as shown in Part G of FIG. 2.

In the meantime, the reference clock signal is inputted to the ranging device 27 as described above. When the ranging pulse is inputted to the ranging device 27, the ranging device 27 obtains a time difference t3 between the ranging pulse and a reference clock pulse which was inputted immediately before the input of the ranging pulse, and calculates a distance, that is, the flight distance of the rocket by means of known computing processing on the basis of the time difference t3. The ranging device 27 delivers the distance data to the display recorder 28.

The aforesaid distance data and the measurement data sent from the data translator 22 are displayed and recorded by the display recorder 28.

As described above, in the preferred embodiment of the present invention, ranging signals are inserted into a telemeter signal transmitted from a flight object, such as a rocket, and prior to the flight of the flight object, an operational time reference for an apparatus provided on the flight object is made to agree with that for an apparatus provided on the ground. A ranging signal is separated and extracted from the telemeter signal received from the flight object in flight, and a time difference between the ranging signal and a reference clock signal independently generated by the apparatus provided on the ground is obtained, thereby computing the flight distance of the flight object on the basis of the time difference.

The above-described embodiment provides the following advantages.

(A) Since the telemeter signal is composed of a serial data sequence and can be restored at any time on the basis of frame sync data in the apparatus provided on the ground, the ranging word contained in the telemeter signal can be identified (separated and extracted) at any time. Accordingly, it is possible to obtain measurement data at any point in time (without the need for continuous observation), and even if an interruption occurs in signal reception, it is possible to again perform ranging after the restart of the signal reception.

(B) Since the present embodiment is based on the oneway ranging method, there is no need to provide a transponder or the like on the flight object nor to provide a ranging (transmitting-receiving) system on the ground side separately from a telemeter system. In addition, since the apparatus on the flight-object side may be composed of only a telemeter-signal transmitting system, and the apparatus on the ground side only a telemeter-signal receiving system, it is possible to realize a very simple and inexpensive system construction.

(C) Since the ranging signal can be transmitted in the state of being contained in the telemeter signal, it is not necessary to separately prepare ranging-signal transmitting means, so that control of transmission-reception of signals can be easily performed.

While the foregoing description and drawings represent the preferred embodiments of the present invention, it will be obvious to those skilled in the art that various changes and modifications may be made therein without departing from the true spirit and scope of the present invention.

What is claimed is:

1. A ranging method for measuring a flight distance of a flight object, comprising the steps of:
   preparing a telemeter transmitting apparatus and a telemeter receiving apparatus, the telemeter transmitting apparatus being provided on the flight object and the telemeter receiving apparatus being provided on the ground, the telemeter transmitting apparatus and the telemeter receiving apparatus being operative on the basis of time references of their own;
   causing the telemeter transmitting apparatus to transmit a telemeter signal which is formed on the basis of its own time reference, which is composed of a serial data sequence having a frame construction made up of a plurality of words, and which has ranging words inserted at intervals of a predetermined number of words, each of the ranging words containing a ranging signal only;
   causing the telemeter receiving apparatus to generate ranging reference clock signals on the basis of the time reference at intervals equivalent to the periods of insertion of the respective ranging words in the telemeter signal;
   causing the time reference of the telemeter transmitting apparatus and the time reference of the telemeter receiving apparatus to agree with each other prior to flight of the flight object; and causing the telemeter receiving apparatus to identify each of the ranging words from the telemeter signal received from the telemeter transmitting apparatus provided on the flight object in flight, separate and extract the ranging signal from the identified ranging word, find a time difference between the obtained ranging signal and a corresponding ranging reference clock signal, and calculate the flight distance of the flight object.

2. A telemetering system for measuring a flight distance of a flight object comprising:

a) telemeter transmitting means for being provided on a flight object, said telemeter transmitting means for transmitting a telemeter signal and including:

means for providing an internal time reference; and means, based on said internal time reference, for causing said telemeter signal to be composed of a serial data sequence having a frame construction made up of a plurality of words and which has ranging words inserted at intervals of a predetermined number of words, each of the ranging words containing a ranging signal only; and b) telemeter receiving means for ground operation, said telemeter receiving means for receiving a transmitted telemeter signal from said telemeter transmitting means, said telemeter receiving means including:

means for providing an internal time reference;

means based on said internal time reference, for generating ranging reference clock signals at intervals equivalent to the periods of insertion of the respective ranging words in the received telemeter signal; and means for identifying each of the ranging words from the received telemeter signal, for separating and extracting the ranging signal from the identified ranging word, for finding a time difference between the obtained ranging signal and a corresponding ranging reference clock signal and for calculating the flight distance of the flight object; and means on either the telemeter transmitting means or the telemeter receiving means for causing the internal time references of both said means to agree with each other prior to a flight of the flight object.

3. The system of claim 2 wherein said telemeter transmitter means includes a clock oscillator for providing the internal time reference of said telemeter transmitter means, a PCM encoder, a transmitter portion and an antenna.

4. The system of claim 2 wherein said telemeter receiving means includes a clock oscillator for providing the internal time reference of said telemeter receiving means, a reference clock generator responsive to said clock oscillator, a ranging device responsive to said reference clock generator, a receiving portion for processing the received signal, a data translator and a gate each responsive to the processed received signal, the gate cooperating with said data translator to provide a signal to said ranging device, and a display recorder responsive to outputs of said data translator and ranging device.

5. The system of claim 3 wherein said clock oscillator is adjustable for causing the internal time references of said telemeter transmitting means and telemeter receiving means to agree with each other.

* * * * *